United States Patent
Fourtet et al.

(10) Patent No.: US 9,565,563 B2
(45) Date of Patent: Feb. 7, 2017

(54) METHOD FOR AUTHENTICATING DATA PACKETS RECEIVED BY A STATION OF A DIGITAL TELECOMMUNICATIONS SYSTEM

(71) Applicant: SIGFOX, Labege (FR)

(72) Inventors: Christophe Fourtet, Pompignan (FR); Laurence Sellier, Toulouse (FR)

(73) Assignee: SIGFOX, Labege (FR)

( * ) Notice: Subject to any disclaimer, the term of this patent is extended or adjusted under 35 U.S.C. 154(b) by 208 days.

(21) Appl. No.: 14/408,385

(22) PCT Filed: Jun. 25, 2013

(86) PCT No.: PCT/FR2013/051480
§ 371 (c)(1),
(2) Date: Dec. 16, 2014

(87) PCT Pub. No.: WO2014/001708
PCT Pub. Date: Jan. 3, 2014

(65) Prior Publication Data
US 2015/0148008 A1   May 28, 2015

(30) Foreign Application Priority Data
Jun. 25, 2012   (FR) ..................... 12 56015

(51) Int. Cl.
*H04W 12/06* (2009.01)
*H04L 29/06* (2006.01)
*H04B 1/7156* (2011.01)

(52) U.S. Cl.
CPC .......... *H04W 12/06* (2013.01); *H04B 1/7156* (2013.01); *H04L 63/061* (2013.01);
(Continued)

(58) Field of Classification Search
CPC .................. H04B 1/7156; H04B 2001/71563; H04L 63/061; H04L 63/0876; H04L 63/12; H04L 63/164; H04W 12/06
See application file for complete search history.

(56) References Cited

U.S. PATENT DOCUMENTS 6,188,715 B1 * 2/2001 Partyka ................ H04B 1/7156
340/539.1
7,123,643 B2 * 10/2006 Yamato .................. H04B 1/713
375/133
(Continued)

FOREIGN PATENT DOCUMENTS

WO   2011/154466 A1   12/2011

*Primary Examiner* — Freshteh N Aghdam
(74) *Attorney, Agent, or Firm* — Seed IP Law Group LLP

(57) ABSTRACT

A method of authenticating data packets transmitted by terminals and received by a station, each terminal successively transmitting data packets in a plurality of different frequency bands according to a frequency hop sequence specific to said terminal, includes, for a data packet received by the station, i) measuring the frequency band in which the considered data packet has been received, ii) extracting an identification code from said considered data packet, iii) determining a theoretical frequency hop according to the frequency hop sequence associated with said extracted identification code, and iv) calculating a frequency hop deviation according to the theoretical frequency hop and to the frequency bands measured for the considered data packet and for the previous data packet. The authentication method includes determining whether data packets have been transmitted by the terminal associated with this identification code according to at least one frequency hop deviation.

16 Claims, 1 Drawing Sheet

(52) U.S. Cl.
CPC .......... *H04L 63/0876* (2013.01); *H04L 63/12* (2013.01); *H04L 63/164* (2013.01); *H04B 2001/71563* (2013.01)

(56) References Cited

U.S. PATENT DOCUMENTS

| | | | |
|---|---|---|---|
| 8,842,712 B2* | 9/2014 | Hancock | H04B 1/7156 375/130 |
| 2001/0004375 A1* | 6/2001 | Partyka | H04B 1/7156 375/135 |

* cited by examiner

METHOD FOR AUTHENTICATING DATA PACKETS RECEIVED BY A STATION OF A DIGITAL TELECOMMUNICATIONS SYSTEM

BACKGROUND

The present disclosure relates to the field of digital telecommunications, and more specifically relates to the authentication of data packets transmitted by terminals and received by a station.

STATE OF THE ART

The authentication of data packets received by a station aims at verifying the identity of the terminal having transmitted the data packets.

Many authentication methods are known, which are generally applicable to deterministic tuned telecommunications systems. Such systems are:

either based on bidirectional exchanges between a terminal and a station, by which the terminal and the station synchronize and mutually authenticate;

or based on one-way exchanges between a terminal and a receiver station and on a deterministic time and/or frequency organization known beforehand, enabling to obtain the synchronization of the terminal and of the station.

Further, in this type of deterministic tuned system, the acceptable frequency error should be lower than or in the order of the system bandwidth.

Now, in a tuned telecommunications system, such as that discussed in document US 2001/004375, the terminals and the station consider a same predefined list of frequency bands in which the data packets can be transmitted. Thereby, in this type of system, it is possible to verify whether the predefined sequence of frequency hops has been respected by directly comparing the measured frequency band with the expected frequency band among the frequency bands of the predefined list.

This type of verification is no longer possible in non-tuned telecommunications systems since there is an incompatibility between the frequency bands used by the terminals and the theoretical frequency bands expected by the receiver station. This is all the truer when the frequency synthesis means of the terminals have a significant frequency drift. Such non-deterministic systems comprise one-way components where communications are only possible from the terminal to the station. Such a telecommunications system where the drift of the frequency synthesis means of the terminals is greater than the instantaneous spectral width of the data packets transmitted by said terminals is disclosed in document WO 2011/154466.

It should thus be understood that the authentication methods developed for deterministic and tuned telecommunications systems cannot be applied to non-deterministic, non-synchronized, and non-tuned telecommunications systems, where the time and frequency organization of communications between the terminal and the station complies with no predetermination, synchronization, or tuning imperative. Further, in such non-tuned systems, the frequency error may be larger than the system bandwidth.

Further, conventional authentication methods generally rely on the inclusion in the data packets, in addition to a terminal identification code, of additional control data dedicated to authenticating said terminal having transmitted said data packets.

Adding such control data dedicated to the terminal authentication contributes to decreasing the ratio between the quantity of useful data and the quantity of control data present in each data packet. This ratio will be all the smaller as the quantity of useful data present in each data packet is small, as for example in the case of low-speed telecommunications systems.

SUMMARY

An embodiment may overcome all or part of the limitations of prior art solutions, particularly those discussed hereabove, in the case of digital one-way non-deterministic telecommunications systems. In such systems, each terminal successively transmits data packets in a plurality of different frequency bands which are not predetermined, and according to a predefined frequency hop sequence specific to the terminal. Further, each data packet incorporates an identification code of the terminal having transmitted it.

An embodiment relates to an authentication method comprising, for each data packet received by a receiver system comprising at least one station:

the measurement, by the station having received the considered data packet, of the frequency band in which the considered data packet has been received, extracting the identification code contained in the considered data packet, calculating a frequency hop, based on the measured frequency band of the considered packet and on a frequency band measured by the receiver system for a previous received data packet incorporating an identification code identical to the extracted identification code, determining, according to the predetermined frequency hop sequence associated with the identification code extracted from the considered data packet, a theoretical frequency hop applied from the previous received data packet, and calculating a frequency hop deviation according to the theoretical frequency hop and to the calculated frequency hop.

In an embodiment, the authentication method comprises determining whether the data packets successively received with a same identification code have been transmitted by the terminal associated with the extracted identification code according to at least one frequency hop deviation calculated for one of the data packets.

In an embodiment, for each data packet, a frequency hop deviation is calculated according to the theoretical frequency hop, to the frequency band measured for the considered data packet, and to the frequency band measured for the previous data packet received with the same identification code. The authentication method is thus robust to the possible absence of tuning between the terminals and the station.

In an embodiment, a receiver system may be formed either of an assembly formed of one or a plurality of stations, or of an assembly formed of one or a plurality of stations in cooperation with a processing server.

Thus, the transmit frequency band of the considered data packet is measured in the reference frame of the station having received the considered data packet. Thereby, in the case where the receiver system particularly comprises a plurality of stations, each station will measure the frequency bands of the packets that it receives. Such frequency band measurements are thus obtained independently from the conditions of transmission by the terminal and from the differences in receive conditions between stations.

In certain extreme receive conditions, a frequency variation in the receive reference frame can be observed during the reception of a same packet. This results in an ambiguity in the calculation of the frequency hop deviation. In such conditions, the authentication decision may be based on the accumulation of the deviations of a plurality of successively-calculated frequency hops, or any other statistical operation applied to a series of successively-calculated frequency hop deviation values.

In a variation, it is also possible to develop a training system based on the history of the calculated deviations, and to dynamically adjust the threshold criterion relative to the maximum acceptable difference between deviations.

Such provisions facilitate discarding data packets transmitted by a malicious terminal pretending to be an authorized terminal. It should indeed be understood that if a malicious terminal pretends to be an authorized terminal by using the identification code of said authorized terminal, without however knowing the predefined frequency hop sequence associated with said authorized terminal, the calculated frequency hop deviation(s) may facilitate determining that all or part of these data packets have been transmitted by a malicious terminal.

The authentication method of an embodiment is adapted to non-tuned telecommunications systems, that is, systems where the terminal and the station are not frequency-synchronized. Further, such an authentication requires no manifest prerequisite as to the telecommunications system, and can thus be applied by extension to any telecommunications system, be it one-way or not, tuned or not, synchronized or not.

It should further be noted that an embodiment of such an authentication method is particularly adapted to low-speed telecommunications systems.

As an illustrative example, a terminal systematically transmitting with a frequency bias $\delta F$ relative to the receiver station is considered, that is, said terminal transmits in a frequency band $F1+\delta F$ when it is intended to transmit in a frequency band $F1$, and then in a frequency band $F2+\delta F$ instead of $F2$ ($F2$ being equal to $F1+\Delta F$, $\Delta F$ being the theoretical frequency hop), etc. In this case, the frequency band deviation, that is, the deviation between the frequency band in which the terminal transmits and the theoretical frequency band expected by the station, is always substantially equal to $\delta F$ (to within measurement errors when the environmental conditions are equivalent, in terms of temperature and voltage). The frequency hop deviation is substantially zero (to within measurement errors) since the frequency hop between frequency band $F1+\delta F$ and frequency band $F2+\delta F$ is equal to theoretical frequency hop $\Delta F$.

In specific embodiments, the authentication method comprises one or a plurality of the following characteristics, taken separately or according to all technically possible combinations.

In a specific embodiment, the frequency band of a data packet is measured a plurality of times during each data packet, and the frequency hop deviation is calculated by considering the final measured frequency band of the considered data packet and the final measured frequency band of the previous data packet incorporating the same identification code as the considered data packet.

Such provisions facilitate avoiding certain cases of authentication failures, particularly in the case of terminals with a significant frequency drift of its frequency synthesis means (such as for example disclosed in document WO 2011/154466), and with a frequency band used by a terminal which may non-negligibly vary within a same data packet.

In this case, the frequency drift behavior on turning-on of an oscillator of a transmit terminal provides a specific unique pattern, which is perfectly repeatable, and which can be modeled in time. This specific pattern forms a sort of "signature" which depends on the unique assembly of the electronic components in the transmit terminal. In practice, advantage may advantageously be taken from this signature by considering the frequency band measured at the end of the considered data packet and the frequency band measured at the end of the previous data packet incorporating the same identification code, and thus having the same frequency drift pattern (any other environmental parameter being considered as constant). It should be understood that the frequency band variations on two frames, successive or not, of same length, will be identical if they are measured at the same time with respect to the turning-on of the circuits of the transmit terminal.

Thereby, to reinforce the authentication method in an embodiment, it is possible to implement complementary steps by using the frequency drift of the oscillator of the transmit terminal. Thus, advantageously, the authentication method may further comprise, for each data packet received by the receiver system:

the measurement, by the receiver system, of a frequency drift pattern of an oscillator having been used to generate the considered data packet, and comparing the measured frequency drift pattern with a predefined frequency drift pattern associated with said identification code extracted from said considered data packet.

In particular, in a context where the battery of the transmit terminal is desired to be saved, it is not desirable to turn on the oscillator long before the sending of a frame, to leave time for the oscillator to stabilize. Thereby, in such a context of economy, the oscillator is generally activated just at the time of the sending of the frame and the frame thus necessarily contains the "signature" representative of the frequency drift of the oscillator.

For example, the frequency band of a data packet may be measured a plurality of times during each data packet. Such multiple measurements may thus be used to create the model of the specific unique frequency drift behavior pattern of the transmit terminal, that is, its "signature", on the given packet. This model may then be compared with a unique reference pattern known by the transmit terminal having transmitted the packet and recorded for example on manufacturing thereof or on putting into service thereof.

In practice, to be able to determine the theoretical frequency hop corresponding to two sequentially-received packets, it is advantageous to make sure that these two packets having been transmitted sequentially. When lost frames are detected, it is advantageous to recalculate the theoretical frequency hop deviation according to the number of lost frames.

Thus, in a specific embodiment, the authentication method comprises, after the step of extracting the identification code from the considered data packet, a step of estimating a number of lost data packets, said lost data packets corresponding to data packets which have been transmitted by the terminal associated with said identification code since the previous data packet incorporating said identification code has been received, but which have not been received by the receiver system, and particularly by the station. The theoretical frequency hop for the considered data packet is then determined according to the number of lost data packets and to the sequence of frequency hops associated with said identification code.

Such provisions also facilitate avoiding certain cases of authentication failures. Indeed, the frequency hop between two data packets received by the station may correspond to the sum of a plurality of consecutive frequency hops, if data packets have been transmitted between said two data packets but have not been received by the station. The estimation of the number of lost packets then enables to determine the number of frequency hops performed, and accordingly to estimate the theoretical frequency hop as being the sum of said performed frequency hops.

In a specific embodiment, wherein said data packets incorporate a counter incremented by the terminal for each new transmission, the number of lost packets is estimated according to the counter of the considered data packet and to the counter of the previous received data packet incorporating the same identification code as said considered data packet.

In a specific embodiment, wherein said data packets comprise a portion ciphered by means of a rolling code incremented by the terminal for each new transmission, the number of lost packets is estimated according to the rolling code used for the considered data packet and to the rolling code used for the previous received data packet incorporating the same identification code as said considered data packet.

In a specific embodiment, wherein the data packets are transmitted by a terminal with a predefined period, the number of lost packets is estimated according to said period and to a time interval between the reception of the considered data packet and the reception of the previous data packet incorporating the same identification code as said considered data packet.

In a specific embodiment, the data packets successively received with a same identification code are only considered as having been transmitted by the terminal associated with said identification code if each frequency hop deviation considered for the authentication has an absolute value smaller than a threshold value.

In an embodiment, the threshold value to be used for the considered data packet is determined according to a time interval between the reception of the considered data packet and the reception of the previous data packet incorporating the same identification code as said considered data packet.

In a specific embodiment wherein a plurality of frequency hop deviations are considered for the authentication, the data packets successively received with a same identification code are only considered as having been transmitted by the terminal associated with said identification code if a predefined authentication criterion is verified by all the frequency hop deviations considered for the authentication.

In other words, the packet validity diagnosis may be delayed until a general validation criterion is achieved, this statistical criterion validating in retrospect all the packets waiting to be validated. In such conditions, the system is sometimes waiting for a validation of a sub-set of packets.

In a specific embodiment, the authentication criterion is verified if the accumulation of the frequency hop deviations considered for the authentication is smaller than a predefined threshold value.

In an embodiment, the verification of the authentication criterion may also be based on the expectation, the variance, or any other statistical property on the frequency hop deviations considered for the authentication.

In a specific embodiment, the receiver system may comprise a backbone cooperating with one or a plurality of station(s). In this case, the operations of the authentication method may be distributed between the backbone and the station(s).

In an embodiment, the station measures the frequency band of the data packets that it receives, and the backbone collects all the data packets received by each station and the frequency bands measured by each station, and carries out at least the remaining operations of the above-discussed authentication method.

In an embodiment, a computer program product comprises a set of program code instructions which, when they are executed by a processor, implement an authentication method according to an embodiment disclosed herein.

In an embodiment, a receiver system comprises at least one station of a digital telecommunications system, capable of receiving data packets transmitted by terminals, each data packet incorporating an identification code of the terminal having transmitted said data packet, each terminal successively transmitting data packets in a plurality of different frequency bands according to a predefined frequency hop sequence specific to said terminal. The receiver system further comprises means configured to authenticate the received data packets in accordance with a method disclosed herein.

In an alternative implementation allowing a scalable deployment, the receiver system may comprise stations capable of receiving the packets transmitted by the terminals and a backbone. Each station may comprise means of communication with the backbone and means for performing part of the authentication method. The backbone comprises means for performing the other part of the method of authenticating received data packets.

In an embodiment, a telecommunications system comprises:
  terminals, each terminal being capable of successively transmitting data packets in a plurality of different frequency bands according to a predefined frequency hop sequence specific to said terminal (10) having transmitted said data packet,
  stations cooperating with a backbone to carry out the authentication method,
    each station being capable of measuring the frequency bands of the data packets that it receives; and
    the backbone being capable of collecting all the data packets received by each station and the frequency bands measured by each station, and being capable of carrying out at least the remaining operations of the authentication method which are not carried out by the station.

DESCRIPTION OF THE DRAWINGS

The disclosure will be better understood on reading of the following description, given as a non-limiting example, in relation with the drawings, which show.

DETAILED DISCUSSION OF A SPECIFIC EMBODIMENT

Figure 1:
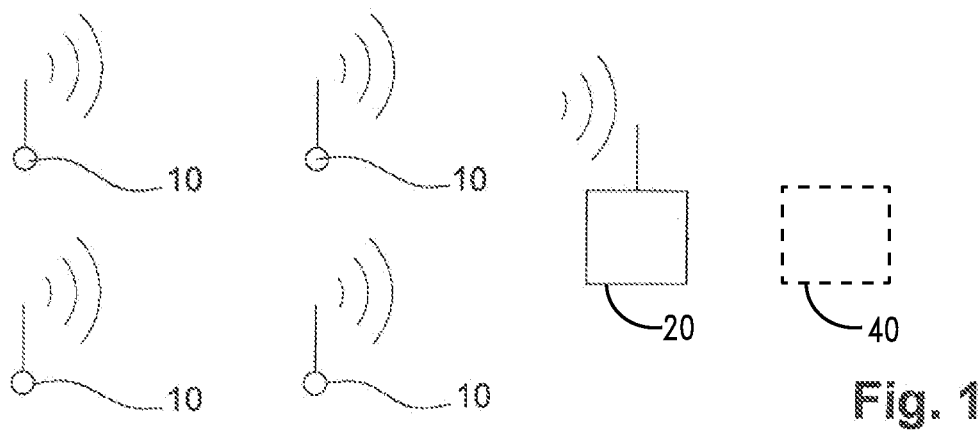
FIG. 1: a simplified representation of a digital telecommunications system.

FIG. 1 very schematically shows a telecommunications system comprising one or a plurality of transmitters such as terminals 10 and one or a plurality of stations 20 (a single station has been shown in FIG. 1 for clarity). In the context of the disclosure, "station" generally means any device capable of receiving data packets in the form of radioelectric signals. Station 20 is for example a specific device such as an access point of a wired or wireless telecommunications network.

"Radioelectric signal" means an electromagnetic wave propagating via wireless means having frequencies in the conventional spectrum of radioelectric waves (from a few hertz to several hundreds of gigahertz) or in neighboring frequency bands.

It should be noted that the case of a data packet transmission from terminals 10 to station 20 is mainly considered. The possible transmission of data packets by station 20 to terminals 10 is not discussed herein.

Terminals 10 transmit data packets to station 20 in a shared frequency resource, called "macrochannel" (or signal multiplexing band corresponding to the receive band of the station) in telecommunications networks, having a spectral width $\Delta M$.

The data packets are transmitted by terminals 10 in frequency bands of predefined spectral width $\Delta B$ smaller than $\Delta M$. In an embodiment, spectral width $\Delta M$ of the macrochannel is significantly greater than spectral width $\Delta B$, to be able to multiplex a large number of terminals 10. For example, spectral width $\Delta M$ is at least one hundred times greater than spectral width $\Delta B$.

Each terminal 10 recurrently transmits data packets to station 20. Data packets successively transmitted by a same terminal 10 are transmitted in different frequency bands according to a predefined frequency hop sequence specific to said terminal 10. Further, each data packet incorporates an identification code of the terminal 10 having transmitted said data packet.

In a variation, a backbone 40 may be associated with stations 20 as illustrated in FIG. 1.

Thereby, hereafter, term "transmitter" will relate to a terminal 10, and term "receiver system" will indifferently relate to a station or to an assembly formed of at least one station in cooperation with a backbone.

Further, in the following description, the terminals are designated with the same reference 10. When it is necessary to distinguish a terminal from another terminal, an alphabetic index specific to the considered terminal is appended to the corresponding reference numeral. For example, a generally-considered terminal will be designated by 10, while terminals 10a, 10b, 10c, etc. will correspond to specific terminals.

According to a non-limiting example, a terminal 10a is configured to transmit in successive frequency bands defined by a base frequency band Fa and a sequence Sa comprising (N−1) successive frequency hops Sa={$\Delta Fa_1$, $\Delta Fa_2$, ..., $\Delta Fa_{N-1}$}. Thus, terminal 10a first transmits a data packet in frequency band Fa, then in frequency band (Fa+$\Delta Fa_1$), and then in frequency band (Fa+$\Delta Fa_1$+$\Delta Fa_2$), etc. The set of frequency hops of sequence Sa is for example selected to be such that:

$$\sum_{n=1}^{N-1} \Delta Fa_n = 0$$

so that, after having applied all the frequency hops of sequence Sa, terminal 10a transmits again, theoretically, in base frequency band Fa.

Similarly, terminal 10b is associated a base frequency band Fb and a specific sequence Sb of (M−1) successive frequency hops Sb={$\Delta Fb_1$, $\Delta Fb2$, ..., $\Delta Fb_{M-1}$}, a terminal 10c is associated a base frequency band Fc and a specific sequence Sc of (P−1) successive frequency hops Sc={$\Delta Fc_1$, $\Delta Fc_2$, ..., $\Delta Fc_{P-1}$}, etc.

Lengths M, N, P, and generally any sequence length may be selected independently and arbitrarily. In particular, they may be selected to be arbitrarily large, so that the sequence does not exhibit such an apparent repetitive cycle.

The frequency hop sequence of terminal 10 (that is, sequence Sa of terminal 10a, sequence Sb of terminal 10b, sequence Sc of terminal 10c, etc.) may be obtained either by station 20, or by server 40 (backbone). For example, station 20 may comprise an electronic memory 30 having a look-up table associating, with each possible identification, the corresponding frequency hop sequence stored therein. Of course, this look-up table may be stored in server 40.

In an embodiment, each station 20 receives and measures the frequency band, and server 40 collects all the packets and the frequency measurements measured by the station(s) 20, and carries out the authentication operation by comparatively using all the results to consolidate and reliably determine the diagnosis.

In the above example, the frequency hop sequences are cyclic, apparently or not. Nothing precludes, according to other examples, having non-cyclic frequency hop sequences, for example, generated by means of a linear feedback shift register or LFSR with predefined generating polynomial(s) which may be obtained by station 20.

The following description relates, without this being a limitation, to a digital telecommunications system such as described in international application WO 2011/154466, where the data packets have a narrow band (spectral width $\Delta B$ in the range from a few hertz to a few hundreds of hertz) and the frequency drift of the frequency synthesis means of the terminals is greater than spectral width $\Delta B$.

Accordingly, terminal 10a, when it theoretically transmits in base frequency band Fa, practically transmits in a frequency band F'a which may be separated from base frequency band Fa by a spectral width greater than $\Delta B$. Similarly, frequency hops {$\Delta F'a_1$, $\Delta F'a_2$, ..., $\Delta F'a_{N-1}$} may differ from frequency hops {$\Delta Fa_1$, $\Delta Fa_2$, ..., $\Delta Fa_{N-1}$}. However, the error in the frequency hop is much lesser than that in the frequency band. Indeed, in a non-tuned system where the station performing the frequency band measurements has a frequency accuracy of 10 ppm, for example, neither corrected nor compensated for by a synchronization mechanism, the frequency error induced for base frequency band Fa around 1 GHz is 10 kHz, while the frequency error on a 10-kHz hop is 0.1 Hz only. Accordingly, the value of the frequency hop is perfectly discriminating, while frequency Fa itself is not.

It should thus be understood that an advantage of the authentication method of an embodiment is that neither station 20 nor server 40 (backbone), although they have access to the frequency hop sequences of each terminal 10, neither can nor need to directly discriminate the frequency band in which a terminal 10 has transmitted a packet for authentication purposes. This authentication method fundamentally differs from deterministic methods such as described in document US2001/0004375, which are based on frequency measurement and discrimination to authenticate the packets.

In a specific embodiment, station 20 comprises an analog receiver unit and a digital receiver unit.

The analog receiver unit is capable of receiving a general signal corresponding to all the radioelectric signals received in the macrochannel. For this purpose, it comprises a set of means, considered as known by those skilled in the art (antennas, analog filters, amplifiers, local oscillators, mixers, etc.), capable of shifting the frequency of the general signal.

The analog receiver unit outputs an analog signal corresponding to the general signal shifted around an intermediate frequency lower than the central frequency of the multiplexing band, and which may be zero.

The digital receiver unit conventionally comprises one or a plurality of analog-todigital converters (A/D) capable of sampling the analog signals delivered by the analog receiver unit to obtain a digital signal.

The digital receiver unit further comprises a unit for processing the digital signal at the output of the A/D converters. The processing unit detects, from the digital signal, data packets transmitted by terminals 10 and present in the general signal. The processing unit also executes a method 50 of authenticating the detected data packets, described in further detail hereafter.

In an embodiment, an authentication method 50 may be distributed between a calculation unit allocated by server 40 and a calculation unit of station 20.

The processing unit for example comprises a processor and an electronic memory having a computer program product stored therein, in the form of a set of program code instructions which, when they are executed by the processor, implement all or part of the steps of an authentication method 50. In a variation, the processing unit comprises programmable logic circuits, of FPGA, PLD, etc., type and/or application-specific integrated circuits (ASICs), capable of implementing all or part of the steps of an authentication method 50.

Figure 2:
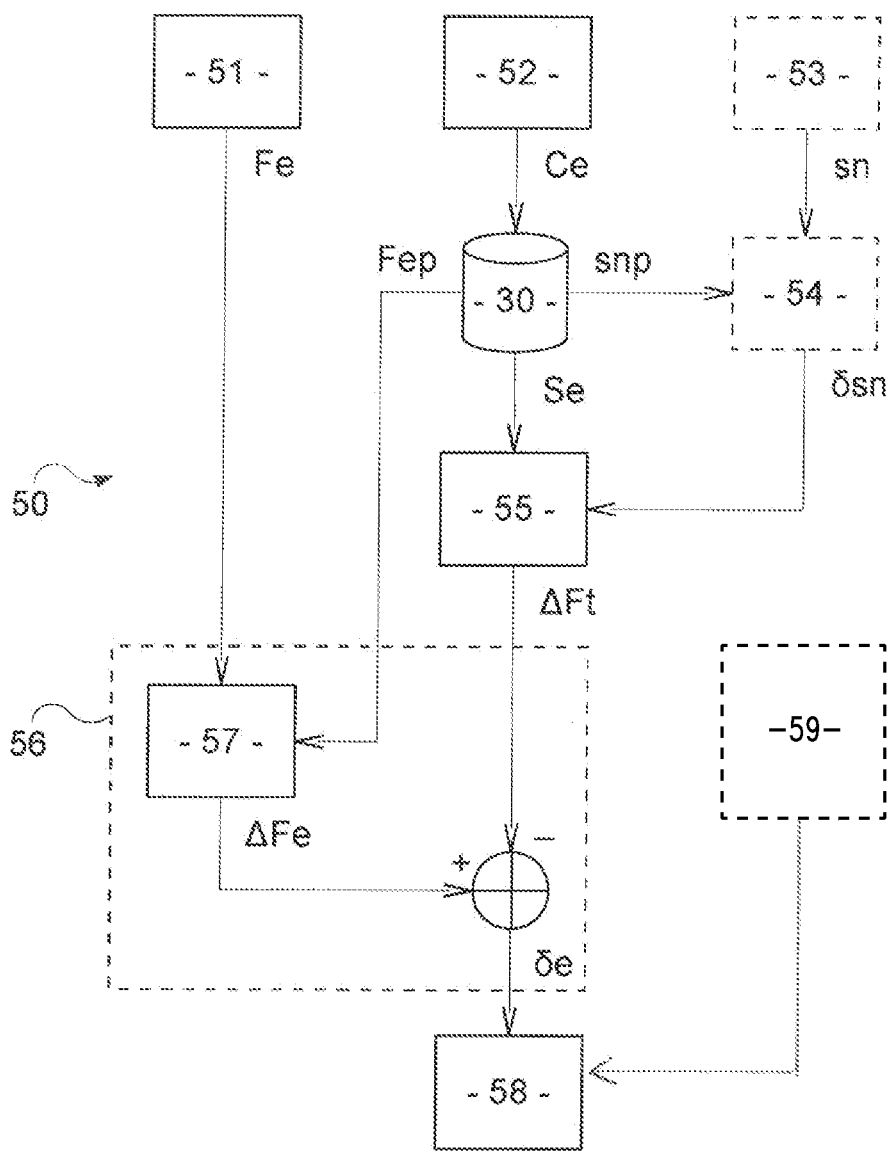
FIG. 2: a diagram illustrating an embodiment of an authentication method.

FIG. 2 shows an embodiment of a method 50 of authenticating data packets received by station 20.

Authentication method 50 comprises steps which are executed by the receiver system for each received data packet, the steps including:
51 measuring the frequency band where the considered data packet has been received,
52 extracting the identification code from said considered data packet,
55 determining a theoretical frequency hop according to the frequency hop sequence associated with said identification code extracted from the considered data packet,
56 calculating a frequency hop difference according to the theoretical frequency hop, to the frequency band measured for the considered data packet, and to the frequency band measured for the previous received data packet incorporating the same identification code as said considered data packet.

During measurement step 51, station 20 measures the frequency band of the considered data packet, called "Fe" hereafter, and then extracts the identification code during extraction step 52, called "Ce" hereafter.

For the description of the embodiment illustrated in FIG. 2, the case where identification code Ce extracted from the considered data packet corresponds to the identification code associated with terminal 10a is considered, without this being a limitation.

Based on identification code Ce, the calculation unit, located either in station 20 or in server 40 (backbone), obtains the frequency hop sequence associated with said identification code Ce, previously stored in electronic memory 30, and obtains sequence Sa of frequency hops associated with terminal 10a.

The calculation unit also obtains data relative to the previous data packet received with identification code Ce, that is, in the present case, received from terminal 10a. These data have been previously stored in the database of the network, as a result of the execution of the steps of authentication method 50 for a previous data packet received from terminal 10a.

Particularly, the calculation unit obtains the frequency band measured for the previous data packet during measurement step 51 and stored in electronic memory 30, called "Fep" hereafter.

In the specific embodiment illustrated in FIG. 2, the case where each terminal 10 incorporates in a transmitted data packet a counter which is incremented for each new transmission by said terminal is considered, without this being a limitation. For example, when terminal 10a transmits a data packet in base frequency band Fa, the counter is equal to 0, when it transmits the next data packet (in frequency band Fa+ΔF1a), the counter is equal to 1, etc. In this case, authentication method 50 may comprise a step 53 of extracting the counter from the considered data packet, called "sn" hereafter.

In this case, the data, obtained by station 20 from identification code Ce in electronic memory 30, also comprise the counter of the previous data packet received with identification code Ce, called "snp" hereafter.

In the specific embodiment illustrated in FIG. 2, authentication method 50 further comprises a step 54 of estimating the number of lost packets, called "Ssn" hereafter. The lost data packets correspond, in the present case, to data packets which have been transmitted by terminal 10a since the previous data packet received from terminal 10a has been received, but which have not been received by station 20.

Number Ssn of lost data packets may be estimated according to counter sn extracted from the considered data packet and to counter snp extracted from the previous data packet received with the same identification code Ce. For example, if counter sn is equal to n (modulo N) and if counter snp is equal to (n−d) (modulo N, d≥1), then number Ssn of lost packets is equal to (d−1) and may be equal to zero.

During step 55, station 20 calculates a theoretical frequency hop, called "ΔFt" hereafter, according to sequence Sa of frequency hops obtained from identification code Ce extracted from the considered data packet. Theoretical frequency hop ΔFt corresponds to the frequency hop theoretically applied since the transmission of the previous data packet received with the same identification code Ce.

Theoretical frequency hop ΔFt, in the example illustrated in FIG. 2, is also calculated according to counters sn (equal to n) and snp (equal to (n−d)). In the considered case of data packets received from terminal 10a, theoretical frequency hop ΔFt is for example calculated according to the following expression:

$$\Delta Ft = \sum_{k=sn-\delta sn}^{sn} \Delta Fa_k$$

For example, if sn=4 and (sn−Ssn)=4 (that is, no data packet has been lost), theoretical frequency hop ΔFt is equal to ΔFa$_4$. If sn=4 and (sn−Ssn)=3 (that is, one data packet has been lost), theoretical frequency hop ΔFt is equal to (ΔFa$_3$+ΔFa$_4$), etc.

During step 56, station 20 calculates a frequency hop deviation, called "δe" hereafter.

In the specific embodiment illustrated in FIG. 2, authentication method 50 further comprises a step 57 of calculating a real frequency hop, called "ΔFe" hereafter. Real frequency hop ΔFe is calculated according to measured frequency band Fe and to measured frequency band Fep, for example, according to expression $\Delta Fe=Fe-Fep$. In this case, frequency hop deviation $\delta e$ is calculated as being a distance between theoretical frequency hop $\Delta Ft$ and real frequency hop $\Delta Fe$, for example, according to expression $\delta e=\Delta Fe-\Delta Ft$.

Nothing precludes, according to other examples, calculating frequency hop deviation $\delta e$ differently. In a variation, not shown in drawings, authentication method 50 comprises a step of calculating a theoretical frequency band where the considered data packet should have been received, called "Ft" hereafter. Theoretical frequency band Ft is calculated according to theoretical frequency hop $\Delta Ft$ and to measured frequency band Fep, for example, according to expression $Ft=Fep+\Delta Ft$. In this case, frequency hop deviation $\delta e$ may be calculated as being a distance between measured frequency band Fe and theoretical frequency band Ft, for example, according to expression $\delta e=Fe-Ft$.

In an embodiment, in particular when the frequency drift of the frequency synthesis means of terminals 10 is large, the frequency band of the considered data packet may be measured a plurality of times during said considered data packet. For example, during measurement step 51, the frequency band is measured L times, to obtain respectively measured frequency bands $Fe_1$ (first measurement), $Fe_2, \ldots, Fe_L$ (last measurement). Similarly, for the previous data packet, a plurality of measurements are performed to obtain respectively measured frequency bands $Fep_1$ (first measurement), $Fep_2, \ldots, Fep_L$ (last measurement). In this case, frequency hop deviation $\delta e$ may be calculated by considering measured frequency band $Fe_L$ of the considered data packet and measured frequency band $Fep_L$ of the previous data packet incorporating the same identification code as said considered data packet. In the case illustrated in FIG. 2, this amounts to calculating real frequency hop $\Delta Fe$ according to expression $\Delta Fe=Fe_L-Fep_L$.

Nothing however precludes, when the frequency band of the considered data packet is measured a plurality of times during a same data packet, considering according to other examples equivalent times of the considered data packet and of the previous data packet. For example, real frequency hop $\Delta Fe$ may be calculated by considering the first measurements (according to expression $\Delta Fe=Fe_i-Fep_i$) or any other measurement (according to expression $\Delta Fe=Fe_i-Fep_i$).

When the frequency drift of the frequency synthesis means of terminals 10 is significant, it is possible to identify the terminal from the signature of its frequency drift at the turning-on. Indeed, as known by those skilled in the art, the frequency drift behavior at the turning-on of an electronic device synthesizing a radioelectric frequency exhibits a unique pattern which depends on the unique assembly of the electronic components forming it. Based on measurements $Fe_i$, this single pattern may be restored by a mathematical operation, for example, an interpolation, and it may be compared with the theoretical drift pattern stored in a database for this device.

Authentication method 50 further comprises a step 58 of determining whether the data packets successively received with a same identification code have been transmitted by terminal 10 associated with said identification code according to at least one frequency hop deviation $\delta e$ calculated for one of said data packets.

In an embodiment, a plurality of frequency hop deviations, calculated for different data packets received with a same identification code, are considered during determination step 58 to improve the robustness of the authentication. In the following description, the case where M frequency hop deviations (respectively $\delta e_1, \delta e_2, \ldots, \delta e_M$) are considered during determination step 58 is considered.

In a specific embodiment of determination step 58, the data packets successively received with a same identification code are only considered as having been transmitted by the terminal 10 associated with said identification code if each frequency hop deviation $\delta e_1, \delta e_2, \delta e_M$ has an absolute value smaller than a threshold value. The threshold value is for example predefined according to the maximum frequency drifts observed according to the environmental conditions (temperature) for the frequency synthesis means of terminals 10.

As a numerical example, the above-discussed example is considered, that is, a non-tuned system wherein:

the receiver station has an initial frequency accuracy of 10 ppm ("parts per million"), which is not compensated for by a synchronization mechanism, the frequency error induced for Fa=1 GHz is 10 kHz, the terminal transmits packets of spectrum occupancy $\Delta B=100$ Hz, and the temperature variation is typically 10 ppm in the authorized range or 0.1 ppm per degree.

In this case, from one packet to the other, a typical variation of 10° C. of the temperature conditions around the work temperature will induce between two packets a hop deviation of 0.1 Hz+1 kHz. The threshold value to be applied in this case is around 1 kHz. In specific conditions of implementation, an extreme variation of the temperature conditions will induce between two packets a hop deviation of 0.1 Hz+10 kHz. The hop deviation is then no longer discriminating per se, it is thus possible to adapt the authentication system and to apply a general analysis over a large set of packets successively received by the network. In this case, the analysis may be carried out on the statistical behavior of the received data packets, in particular over all the hop deviations, having an expectation and a variance, when they have realistic statistical values, which will validate all the packets received until the statistic criterion is achieved. However, if a deviation or if a series of deviations of frequency hops $\delta e_1, \delta e_2, \delta e_M$ is too large, the data packets successively received with the same identification code will not be considered as having been transmitted by the terminal 10 associated with said identification code and the authentication will fail.

In another specific embodiment of determination step 58, capable of being combined with the previous one, the data packets successively received with the same identification code are only considered as having been transmitted by the terminal 10 associated with said identification code if a predefined authentication criterion is verified by all said frequency hop deviations $\delta e_1, \delta e_2, \ldots, \delta e_M$ considered for the authentication.

For example, the authentication criterion is verified if the accumulation (sum in absolute or relative value) of the frequency hop deviations $\delta e_1, \delta e_2, \ldots, \delta e_M$ considered for the authentication is smaller than a predefined threshold value.

In addition to the previously-described operations, it is possible to independently implement a step 59 taking into account the frequency drift pattern of the oscillator which has been used to generate the considered data packet, to reinforce the authentication method. Step 59 may particularly comprise:

measuring the frequency drift pattern of the oscillator which has been used to generate the considered data packet, and then comparing this measured frequency drift pattern with a predefined frequency drift pattern associated with said identification code extracted from said considered data packet.

More generally, it should be noted that the embodiments considered hereabove have been described as non-limiting examples, and that variations may accordingly be envisaged.

It should in particular be noted that authentication method 50 may be considered alone or in combination with other authentication methods, to reinforce the robustness of the authentication. For example, the data packets may comprise a portion ciphered by means of a rolling code. A conventional authentication based on the use of rolling codes may be combined with an authentication based on the verification of the frequency hop sequence.

Further, an estimation of the number of lost packets according to a counter incorporated in the data packets has been described hereabove.

Nothing precludes, according to other examples, estimating the number of lost packets in another way. According to a non-limiting example, if a portion of the data packets is ciphered with a rolling key incremented by the terminal for each new transmission, station 20 may increment the rolling key that it uses to attempt to decipher the considered data packet until a rolling key enabling to successfully decipher said considered data packet is obtained. The number of lost data packets is then estimated according to the rolling key enabling to decipher the considered data packet and according to the rolling key which has enabled to decipher the previous received data packet incorporating the same identification code as said considered data packet.

The invention claimed is:

1. A method of authenticating data packets transmitted by terminals and received by a receiver system comprising at least one station, each data packet incorporating an identification code of a terminal having transmitted said data packet, each terminal successively transmitting data packets in a plurality of different frequency bands according to a defined frequency hop sequence specific to said terminal, comprising, for each data packet received by said receiver system:
   measurement, by said station, of the frequency band in which the considered data packet has been received;
   extracting the identification code contained in said considered data packet;
   calculating a frequency hop, based on said measured frequency band of the considered packet and on a frequency band measured by the receiver system for a previous received data packet incorporating said extracted identification code;
   determining, according to the defined frequency hop sequence associated with said identification code extracted from the considered data packet, a theoretical frequency hop applied from said previous received data packet;
   calculating a frequency hop deviation according to said theoretical frequency hop and said calculated frequency hop; and
   determining whether the data packets successively received with a same identification code have been transmitted by the terminal associated with said identification code according to at least one frequency hop deviation calculated for one of said data packets.

2. The method of claim 1, comprising measuring the frequency band of the considered data packet a plurality of times, the frequency hop deviation being calculated by considering the final measured frequency band of the considered data packet and a final measured frequency band of the previous data packet incorporating the same identification code as said considered data packet.

3. The method of claim 1, comprising, after extracting the identification code from the considered data packet, estimating a number of lost data packets, said lost data packets corresponding to data packets which have been transmitted by the terminal associated with said identification code since the previous data packet incorporating said identification code has been received, but which have not been received by the receiver system, the theoretical frequency hop for the considered data packet being determined according to the number of lost data packets and to the frequency hop sequence associated with said identification code.

4. The method of claim 3 wherein the data packets incorporate a counter incremented by the terminal for each new transmission and the number of lost packets is estimated according to the counter of the considered data packet and the counter of the previous received data packet incorporating the same identification code as said considered data packet.

5. The method of claim 3 wherein the data packets comprise a portion ciphered using a rolling code incremented by the terminal for each new transmission and the number of lost packets is estimated according to the rolling code used for the considered data packet and the rolling code used for the previous received data packet incorporating the same identification code as said considered data packet.

6. The method of claim 3 wherein the data packets are transmitted by the terminal in a predefined period and the number of lost packets is estimated according to said period and to a time interval between the reception of the considered data packet and the reception of the previous data packet incorporating the same identification code as said considered data packet.

7. The method of claim 1 wherein the data packets successively receive with the same identification code are only considered as having been transmitted by the terminal associated with said identification code if each frequency hop deviation considered for the authentication has an absolute value smaller than a threshold value.

8. The method of claim 7 wherein the threshold value used for the considered data packet is determined according to a time interval between the reception of said considered data packet and the reception of the previous data packet incorporating the same identification code as said considered data packet.

9. The method of claim 1 wherein a plurality of frequency hop deviations are considered for the authentication and data packets successively received with a same identification code are only considered as having been transmitted by the terminal associated with said identification code if a defined authentication criterion is verified by all of said frequency hop deviations considered for the authentication.

10. The method of claim 9 wherein the authentication criterion is verified if the accumulation of the frequency hop deviations considered for the authentication is smaller than a defined threshold value.

11. The method of claim 1, comprising, for each data packet received by said receiver system:
    measurement, by the receiver system, of a frequency drift pattern of an oscillator having been used to generate the considered data packet, and
    comparing the measured frequency drift pattern with a predefined frequency drift pattern associated with said identification code extracted from said considered data packet.

12. The method of claim 1 wherein the receiver system comprises a backbone cooperating with at least one station, and operations of the authentication method are distributed between said station and said backbone.

13. The method of claim 12 wherein,
each station of the at least one station measures frequency bands of data packets received by the respective station; and
the backbone collects all the data packets received by each station and the frequency bands measured by each station, and carries out at least the remaining operations of the authentication method.

14. A non-transitory computer-readable memory medium whose contents contain instructions which when executed by at least one processor cause the at least one processor to perform a method, the method comprising:
measuring a frequency band in which a considered data packet has been received;
extracting an identification code contained in said considered data packet;
calculating a frequency hop, based on said measured frequency band of the considered packet and on a frequency band measured for a previous received data packet incorporating said extracted identification code;
determining, according to a defined frequency hop sequence associated with said identification code extracted from the considered data packet, a theoretical frequency hop applied from said previous received data packet;
calculating a frequency hop deviation according to said theoretical frequency hop and said calculated frequency hop; and
determining whether data packets successively received with a same identification code have been transmitted by a terminal associated with said identification code according to at least one frequency hop deviation calculated for one of said data packets.

15. A receiver system of a digital telecommunications system, comprising:
one or more memories; and
one or more processors, which, in operations:
measure a frequency band in which a considered data packet has been received;
extract an identification code contained in said considered data packet;
calculate a frequency hop, based on said measured frequency band of the considered packet and on a frequency band measured for a previous received data packet incorporating said extracted identification code;
determine, according to a defined frequency hop sequence associated with said identification code extracted from the considered data packet, a theoretical frequency hop applied form said previous received data packet;
calculate a frequency hop deviation according to said theoretical frequency hop and said calculated frequency hop; and
determine whether data packets successively received with the extracted identification code have been transmitted by a terminal associated with said extracted identification code according to at least one frequency hop deviation calculated for one of said data packets.

16. A telecommunications system comprising:
terminals, each terminal being capable of successively transmitting data packets in a plurality of different frequency bands according to a defined frequency hop sequence specific to said terminal, each data packet incorporating an identification code of the terminal having transmitted said data packet;
a plurality of stations, each station, in operation, measuring frequency bands of the data packets that the station receives; and
at least one backbone server, which, in operation:
extracts an identification code contained in a considered data packets;
calculate a frequency hop, based on said measured frequency band of the considered packet and on a frequency band measured for a previous received data packet incorporating said extracted identification code;
determines, according to a defined frequency hop sequence associated with said identification code extracted from the considered data packet, a theoretical frequency hop applied from said previous received data packet;
calculates a frequency hop deviation according to said theoretical frequency hop and said calculated frequency hop; and
determines whether data packets successively received with a same identification code have been transmitted by a terminal associated with said identification code according to at least one frequency hop deviation calculated for one of said data packets.

* * * * *